United States Patent [19]

Rasshofer et al.

[11] 4,442,236

[45] Apr. 10, 1984

[54] PROCESS FOR THE PRODUCTION OF MOLDED ARTICLES

[75] Inventors: Werner Rasshofer, Cologne; Hermann Schäfer, Leverkusen; Reiner Paul, Muelheim-Ruhr; Josef Beuth, Frechen, all of Fed. Rep. of Germany

[73] Assignee: Bayer Aktiengesellschaft, Leverkusen, Fed. Rep. of Germany

[21] Appl. No.: 522,276

[22] Filed: Aug. 11, 1983

[30] Foreign Application Priority Data

Aug. 24, 1982 [DE] Fed. Rep. of Germany ....... 3231399

[51] Int. Cl.³ .................. C08G 18/14; C08G 18/62; C08G 18/79; C08G 18/22
[52] U.S. Cl. .................. 521/130; 521/51; 521/124; 521/125; 521/137; 528/75
[58] Field of Search .................. 521/51, 130

[56] References Cited

U.S. PATENT DOCUMENTS

| | | | |
|---|---|---|---|
| 3,085,983 | 4/1963 | Hardy | 521/88 |
| 3,454,504 | 7/1969 | Murai et al. | 521/126 |
| 3,567,663 | 3/1971 | Triolo et al. | 521/130 |
| 4,065,410 | 12/1977 | Schafer et al. | 260/2.5 AM |
| 4,218,543 | 8/1980 | Weber et al. | 521/51 |

FOREIGN PATENT DOCUMENTS

| | | | |
|---|---|---|---|
| 56-6036514 | 4/1981 | Japan | 521/130 |
| 6612548 | 6/1966 | Netherlands | 521/130 |
| 969114 | 9/1964 | United Kingdom . | |
| 1048852 | 11/1966 | United Kingdom . | |

OTHER PUBLICATIONS

Kunststoffe 60, pp. 3-7 (1970).

*Primary Examiner*—H. S. Cockeram
*Attorney, Agent, or Firm*—Gene Harsh; Joseph C. Gil

[57] ABSTRACT

A process for the production of optionally cellular molded articles with a smooth outer skin and improved surface characteristics by the reaction, inside a closed mold, of a mixture of one or more organic polyisocyanates, one or more compounds having molecular weights of from 400 to 12,000, which contain at least two isocyanate-reactive groups, chain-linking and/or chain-extending agents, and optionally, known auxiliary agents and additives used in polyurethane chemistry, characterized in that before the reaction, surface-improving additives comprising one or more polymers or copolymers of one or more olefinically-unsaturated monomers, which polymers or copolymers have molecular weights of from 200 to 50,000, are liquid at room temperature, soluble in the reaction mixture, and inert toward isocyanate groups and at least one metal salt of a monocarboxylic acid having at least 8 carbon atoms, are incorporated into the reaction mixture.

13 Claims, No Drawings

PROCESS FOR THE PRODUCTION OF MOLDED ARTICLES

This invention relates to a new process for the production of molded articles with a smooth outer skin and improved surface characteristics, based on polyurethanes and/or polyureas.

BACKGROUND OF THE INVENTION

The production of molded articles having a closed outer skin and cellular core by the isocyanate polyaddition process is known in principle (see, e.g., Kunststoffe 60, pages 3-7 (1970) or German Auslegeschrift No. 1,196,864). With suitable choices of the starting components, it is possible by this process to produce both elastic and rigid molded articles. If little or no blowing agent is used in this process, solid articles are obtained. Processing of the raw materials is preferably carried out by the reaction injection molding process (RSG or RIM process). This is a filling technique in which the liquid starting components are introduced into the mold within the minimum of time through so-called forceably-controlled mixing heads. In the production of molded parts for the automobile industry, for example, di- and/or tri-functional polyether polyols, for example, in the molecular weight range of from 3,000 to 7,000, and low molecular weight diols, such as ethylene glycol and/or butane-1,4-diol or aromatic diamines having sterically hindered amino groups, are thus reacted with polyisocyanates, preferably liquid polyisocyanates or polyisocyanate mixtures of the diphenyl methane series, optionally in the presence of blowing agents (see, e.g., U.S. Pat. Nos. 4,218,543 or 4,065,410).

The molded articles produced in this manner have excellent mechanical properties. It has been found, however, that the articles occasionally have a surface which is not completely free from depressions and pores. Such surface faults can be rendered visible by rubbing a colored powder into the molded article, with the faults creating a light scattering effect and lightening of the surface fault when compared with a deep black (colored with graphite), flawless surface. Moreover, these surface defects are often starting points for mechanical failures and damage.

Such surface defects in the form of pores or pin holes must often be filled in with a repairing or filling material applied by spatula. The repaired area must subsequently be rubbed down and possibly degreased either before or after this operation and optionally lacquered, making the removal of these surface defects involved and expensive.

It was therefore an object of the present invention to provide a process which would enable molded polyurethane articles to be produced without such surface defects. This problem was solved by the process according to the invention.

DESCRIPTION OF THE INVENTION

The instant invention relates to a process for the production of optionally cellular molded articles based on polyurethanes and/or polyureas, having a smooth surface, by the reaction, inside a closed mold, of a mixture of (a) at least one organic polyisocyanate, (b) at least one compound, having a molecular weight of from 400 to 12,000, which contains at least two isocyanate reactive groups, (c) optionally, at least one compound having a molecular weight of from 32 to 399 and containing at least two isocyanate reactive groups, and (d) optionally, known auxiliary agents and additives used in polyurethane chemistry characterized in that surface-improving additives are incorporated into the mixture, these additives consisting of:

(e) at least one polymer or copolymer of one or more olefinically-unsaturated monomers, which polymer or copolymer has a molecular weight of from 200 to 50,000 as determined by vapor pressure osmometry, is liquid at room temperature, soluble in the reaction mixture, and inert towards isocyanate groups, which is used in a quantity of from 0.01 to 1% by weight, based on the quantity of component (b), and (f) at least one metal salt of monocarboxylic acid having at least 8 carbon atoms, which is used in a quantity of from 0.01 to 2% by weight, also based on the quantity of component (b).

The use of isocyanate inert polymers or copolymers for the production of polyurethane foams is already known in principle (British Pat. No. 1,048,852 and U.S. Pat. No. 3,085,983). In the previously disclosed processes, polymers or copolymers are used as foam stabilizers or cell regulators. It has now been discovered, according to the instant invention, that such polymers or copolymers used in very small quantities with certain metal carboxylates for the production of polyurethane molded articles having smooth surface layers destabilize the cell structure, i.e., lead to the collapse of cells creating a smoother, more flawless surface. This effect is extremely surprising in view of the cited prior publications.

The organic isocyanate components used in the process according to the instant invention may be any aliphatic, cycloaliphatic, araliphatic, aromatic or heterocyclic polyisocyanates. Suitable polyisocyanates include, for example, the compounds mentioned by way of example in U.S. Pat. No. 4,065,410, column 2, line 29 through column 3, line 22. Among the preferred starting materials are the derivatives of 4,4'-diisocyanatodiphenyl methane which are liquid at room temperature, for example, the polyisocyanates containing urethane groups which are obtainable, according to German Pat. No. 1,618,380 (U.S. Pat. No. 3,644,457), by the reaction of one mol of 4,4'-diisocyanatodiphenyl methane with 0.05 to 0.3 mols of low molecular weight diols or triols, preferably polypropylene glycols having a molecular weight below 700. Diisocyanates based on 4,4'-diisocyanatodiphenyl methane and containing carbodiimide and/or uretone imine groups, which are obtainable, for example, according to U.S. Pat. Nos. 3,152,163; 3,384,653; 3,449,256; and 4,154,752 or German Offenlegungsschrift No. 2,537,685 may also be used. Other preferred polyisocyanates include the corresponding modification products based on mixtures of 2,4'- and/or 4,4'-diisocyanatodiphenyl methane or also mixtures of 4,4'-diisocyanatodiphenyl methanes modified as described above with minor quantities of tri- or higher-functional polyisocyanates of the diphenyl methane series, for example, those of the type described in German Offenlegungsschrift No. 2,624,526. The preferred polyisocyanates according to the invention are generally polyisocyanates or polyisocyanate mixtures of the diphenyl methane series which are liquid at room temperature, optionally chemically-modified as described above, which have an average isocyanate functionality of from 2 to 2.2., in particular 2, and in which 4,4′-diisocyanatodiphenyl methane is present as the main component (more than 50%, by weight).

Starting component (b) consists of one or more compounds which at least 2 isocyanate reactive hydrogen atoms and have molecular weights (average) calculated from the functionality and the isocyanate-reactive group content, of from 400 to 12,000, preferably from 1,000 to 7,000, and in particular from 2,000 to 6,000. Di- and/or trifunctional polyether polyols are particularly preferred. These polyether polyols are prepared in known manner, for example, by the polymerization of epoxides such as ethylene oxide, propylene oxide, butylene oxide, tetrahydrofuran, styrene oxide or epichlorohydrin, either on their own, e.g., in the presence of Lewis catalysts such as $BF_3$, or by addition of these epoxides, preferably ethylene oxide and propylene oxide, optionally as mixtures or successively, to starting components containing reactive hydrogen atoms, such as water; alcohols, e.g., ethylene glycol, propylene glycol-(1,3) or -(1,2), trimethylol propane, glycerol, sorbitol, 4,4′-dihydroxy-diphenyl propane; ammonia or amines, e.g., aniline, ethanolamine or ethylene diamine. Sucrose polyethers, as described, e.g., in German Auslegeschriften Nos. 1,176,358 and 1,064,938 and polyethers started on formitol or formose (German Offenlegungsschriften Nos. 2,639,083 and 2,737,951) may also be used according to the invention. It is frequently preferred to use polyethers which contain predominantly primary OH groups (up to 90%, by weight, based on all the OH groups in the polyether).

These isocyanate-reactive starting components may also include so-called "amino polyethers" or "amino hydroxy polyethers" within the specified molecular weight range, in which at least 25, preferably 50, and in particular, 80 to 100 percent equivalents of the isocyanate-reactive end groups consist of primary and/or secondary aromatically- or aliphatically-bound amino groups, the remainder being primary and/or secondary aliphatically-bound hydroxyl groups.

In these compounds, the end groups carrying the amino groups may also be linked to the polyether chain by way of urethane or ester groups. Preparation of these "amino polyethers" is carried out in known manner. Thus, for example, amination of polyhydroxy polyethers, such as polypropylene glycol ethers, may be carried out by a reaction with ammonia in the presence of Raney nickel and hydrogen (Belgium Pat. No. 634,741). U.S. Pat. No. 3,654,370 describes the preparation of polyoxyalkylene amines by reaction of the corresponding polyol with ammonia and hydrogen in the presence of a nickel, copper or chromium catalyst. The preparation of polyethers having amino end groups by the hydrogenation of cyano ethylated polyoxy propylene ethers is described in German Pat. No. 1,193,671. Other methods of preparation of polyoxy alkylene- (polyether)-amines are described in U.S. Pat. Nos. 3,155,728 and 3,236,985 and French Pat. No. 1,551,605. The preparation of polyethers containing secondary amino end groups, for example, is described in French Pat. No. 1,466,708.

Relatively high molecular weight polyhydroxy polyethers may be converted into the corresponding anthranilic acid ethers, usable as component (b) according to the invention by a reaction, with isatoic acid anhydride, as described, for example, in German Offenlegungsschriften No. 2,019,432 and 2,619,840 and U.S. Pat. Nos. 3,808,250; 3,975,428; and 4,016,143. Polyethers containing aromatic amine end groups are thereby obtained.

According to German Offenlegungsschrift No. 2,546,536 or U.S. Pat. No. 3,865,791, relatively high molecular weight compounds containing amino end groups are obtained by the reaction of isocyanate prepolymers based on polyhydroxy polyethers with enamines, aldimines or ketimines containing hydroxyl groups, followed by hydrolysis.

Other amino polyethers within the specified molecular weight range, which may be obtained, for example, according to German Offenlegungsschrift No. 2,948,419 or according to German Offenlegungsschrift No. 3,039,600, may also be used.

Any mixtures of the compounds exemplified above which contain isocyanate-reactive groups may, of course, also be used as starting compounds (b) according to the invention.

Also, other compounds within the specified molecular weight range and which contain isocyanate-reactive groups than those exemplified above may be used as starting components (b) according to the invention. Thus, for example, any of the components described by way of example in U.S. Pat. No. 4,218,543, which contain isocyanate reactive groups and have molecular weights within the range of 400 to 12,000, may be used in the process according to the invention.

Starting compounds (c), which are optionally used according to the instant invention, include any chain-lengthening agents or cross-linking agents in the molecular weight range of from 32 (hydrazine) to 399 which contain at least 2 primary or secondary amino groups and/or hydroxyl groups. It is preferred, however, to use the appropriate difunctional compounds.

Examples of such compounds include hydrazine, ethylene diamine, hexamethylene diamine, 1-amino-3,3,5-trimethyl-5-aminomethyl-cyclohexane (IPDA), N,N′-dimethylhydrazine, ethylene glycol, propylene glycol-(1,2) and -(1,3), 1,4-dihydroxy butane and 1,6-dihydroxy hexane. Other suitable examples include glycerol, trimethylol propane, pentaerythritol, quinitol, mannitol, diethylene glycol, triethylene glycol, tetraethylene glycol, dipropylene glycol, tripropylene glycol, dibutylene glycol, diethanolamine, diisopropanolamine, 1,4-diaminobenzene, 2,4-diaminotoluene or 4,4′-diaminodiphenyl methane.

The preferred compounds to be used as component (c) in the process according to the invention include di-primary aromatic diamines having a molecular weight within the specified range and containing an alkyl constituent in at least one ortho position to the amino groups. In particular, suitable compounds of this type have at least one alkyl substituent in the ortho position to the first amino group, and two alkyl substituents, each with 1–3 carbon atoms, in the ortho positions to the second amino group. Those which carry an ethyl, n-propyl and/or isopropyl substituent in at least one ortho position to the amino groups and optionally methyl substituent in other ortho positions to the amino groups are particularly preferred.

Examples of such preferred and particularly preferred diamines include 2,4-diaminomesitylene, 1,3,5-triethyl-2,4-diaminobenzene, 1,3,5-triisopropyl-2,4-diaminobenzene, 1-methyl-3,5-diethyl-2,4-diaminobenzene, 1-methyl-3,5-diethyl-2,6-diaminobenzene, 4,6-dimethyl-2-ethyl-1,3-diaminobenzene, 3,5,3′,5′-tetraethyl-4,4′-diaminodiphenyl methane, 3,5,3′,5′-tetraisopropyl-4,4′-diaminodiphenyl methane and 3,5-diethyl-3′,5′-diisopropyl-4,4′-diaminodiphenyl methane.

The preferred compounds to be used also include aliphatic diols within the molecular weight range of from 62 to 200, e.g, ethylene glycol, 1,2-dihydroxy propane and 1,4-dihydroxy butane. Any mixtures of alcoholic and/or aminic starting components (c) may, of course, also be used.

Starting component (c) may be used in quantities of from 0 to 50%, by weight, preferably from 10 to 40%, by weight, based on component (b) in the process according to the invention.

The known auxiliary agents and additives used in polyurethane chemistry may be used as component (d) in the process according to the invention. These include, for example:

(1) Blowing agents, e.g., acetone, ethylacetate and, in particular, halogenated alkanes such as dichloromethane, trichloromethane, monofluorotrichloromethane, chlorodifluoromethane or dichlorodifluoromethane. Water may also be added, but is less preferred.

(2) Known catalysts for the isocyanate polyaddition reaction, such as those described in, e.g., U.S. Pat. No. 4,065,410, column 5, line 59 to column 6, line 30.

(3) Surface active additives and other additives as described, e.g., in U.S. Pat. No. 4,065,410, column 6, line 34 to column 7, line 2.

(4) Internal mold release agents as described, for example, in U.S. Pat. No. 3,726,952, British Pat. No. 1,365,215 and U.S. Pat. Nos. 4,058,492; 4,033,912; 4,024,090; and 4,098,731.

Other examples of auxiliary agents and additives optionally used according to the invention, i.e. surface active additives and foam stabilizers, flame retarding substances, plasticizers, dyes and fillers and fungistatic and bacteriostatic substances and details of the use and mode of action of these additives may be found in Kunststoff Handbuch, Volume VII, published by Vieweg and Hochtlen, Carl Hanser Verlag, Munich, 1966, e.g., on pages 103 to 113.

The use of surface-improving additives composed of two individual components (e) and (f) is an essential part of the invention.

Component (e) consists of polymers or copolymers of olefinically-unsaturated monomers within a molecular weight range, determined by vapor pressure osmometry, of from 200 to 50,000, preferably from 2,000 to 30,000, and most preferably from 5000 to 15,000, which are liquid at room temperature, soluble in the reaction mixture or compatible with it, and inert towards isocyanate groups. The polymers and copolymers generally have a viscosity of from 1 to 1,000 mPa.s at 100° C. These polymers and copolymers are preferably composed of from 50 to 100 parts, by weight, of at least one $C_1$–$C_{18}$ alkyl ester, preferably a $C_1$–$C_{10}$ alkyl ester of acrylic or methacrylic acid, and from 0 to 50 parts by weight of other isocyanate inert, olefinically unsaturated monomers.

Examples of $C_1$–$C_{18}$ alkyl esters which are suitable monomers for the preparation of the polymers or copolymers include methyl acrylate, ethyl acrylate, n-butyl acrylate, n-pentyl acrylate, n-hexyl acrylate, 2-ethylhexyl acrylate, decyl acrylate, dodecyl acrylate, octadecyl acrylate and the corresponding methacrylic acid esters. Examples of other suitable monomers include any olefinically-unsaturated compounds which are inert towards isocyanate groups, e.g., ethylene, propylene, styrene, itaconic acid esters, vinyl acetate, diallyl phthalate, acrylonitrile and methacrylonitrile.

This component may, in principle, also consist partyl or completely of polymers which are free from acrylic and methacrylic esters, as, for example, polystyrenes or stryene copolymers conforming to the conditions indicated above.

The polymers and copolymers are prepared by known methods of substance polymerization, solution polymerization, dispersion polymerization or bead polymerization, preferably by solution or substance polymerization. Such methods have been described, for example, in "Methoden der Organischen Chemie", Houben-Weyl, 4th Edition, Volume 14/1, pages 24-556 (1961).

If polymerization is carried out in solution, solvents, such as methylene chloride, ethanol, isopropanol, n-propanol, n-butanol, iso-butanol, tertiary butanol, methyl to butyl esters of acetic acid, acetone, methylethyl ketone, benzene, and toluene, may be used.

Polymerization is carried out at temperatures from 40° to about 180° C. Percarbonates, peresters, such as tertiary butyl perpivalate or peroctoate, benzoyl peroxide, o-methoxy benzoyl peroxide, dichlorobenzoyl peroxide or azo diisobutyric acid nitrile, for example, may be used as initiators in quantities of from 0.5 to 3% by weight, based on the monomers. Additionally, the usual molecular weight regulators, such as thioglycol, thioglycerol, methyl vinyl carbinol, xanthogenates or tertiary dodecyl mercaptan may also be used.

The polymer or copolymer solution is preferably freed from solvent in suitable apparatus, preferably evaporator screws or thin film evaporators, at temperatures of about 90° to 180° C., before the polymers or co-polymers are used.

Substance or solvent-free polymerization may be carried out, for example, by the process described in German Offenlegungsschrift No. 1,965,740. The additives are oily-to-high viscous liquids at room temperature which are readily-soluble in hydrophobic solvents, such as dichloro, trichloro or tetrachloromethane or trichlorofluoromethane, but also dissolve well in hydrophilic solvents, such as glycol or relatively-high molecular weight polyethylene or polypropylene glycols. In the process according to the invention, additive component (e) is preferably used in the form of a solution with a solid content, for example, of 25–75% by weight, in a hydrophobic solvent or blowing agent of the type exemplified above.

Component (f) consists of metal salts of a monocarboxylic acid with a total of at least 8, preferably 8 to 18, carbon atoms. The carboxylic acids are preferably aliphatic or cycloaliphatic carboxylic acids, which are optionally olefinically-unsaturated, e.g., octane carboxylic acid, dodecane carboxylic acid, stearic acid, oleic acid, linoleic acid, linolenic acid, tall oil acid, arachidonic acid, myristic acid, palmitic acid, margaric acid, arachic acid, cerotic acid, melissic acid, erucaic acid, abietic acid or naphthenic acids. The metals from which the acids are derived are preferably metals of the first to third main groups or second subgroup of the periodic table of elements. These additives are thus salts, for example, of alkali metals, in particular of sodium or potassium, or of alkaline earth metals, in particular magnesium or calcium, or salts of aluminum or of zinc. Zinc salts are particularly preferred.

Component (f) is generally used in the process according to the invention in quantities of from 0.01 to 2%, by weight, preferably from 0.05 to 1%, by weight, based on component (b).

In the process according to the invention, the reactants are otherwise used in proportions corresponding to an isocyanate index of from 70 to 130, preferably of from 90 to 110. The "isocyanate index" is the quotient of the number of isocyanate groups to the number of isocyanate-reactive groups, multiplied by 100. When calculating the isocyanate index, any isocyanate reactive groups (carboxyl groups) present in the mold release agents are not taken into account.

The process according to the invention is preferably carried out by the known reaction injection molding technique (RIM process). Two reactants are generally used in this process, polyisocyanate component (a) being the first reactant, and the "isocyanate-reactive component", i.e., the mixture of component (b) and optional component (c), being the second reactant. Components (e) and (f) and optional component (d) are generally mixed with the isocyanate-reactive component, although it may be advisable, for example, when blowing agents containing isocyanate groups are used, to incorporate these with the polyisocyanate component (a) before the process is carried out. It is, of course, also possible in principle to use mixing heads of the kind which allow three or four separate components to be used in the process according to the invention, so that preliminary mixing of the individual components is unnecessary.

The quantity of optionally-foamable mixture introduced into the mold is normally calculated in order that the molded products will have a density of from 0.1 to 1.4 g/cm$^3$, preferably from 0.2 to 1.3 g/cm$^3$. Molded articles with a density above 1.2 g/cm$^3$ may be obtained in particular when mineral fillers are used. The molded article is frequently released from the mold after a dwell time of only 5 to 90, preferably 20 to 60, seconds.

The starting temperature of the mixture introduced into the mold is generally chosen within the range of 10° to 60° C., preferably 20° to 50° C. The temperature of the mold is generally from 40° to 100° C., preferably from 50° C. to 70° C.

When carrying out the process according to the invention, it is also possible in principle to prepare an isocyanate prepolymer from component (a) and at least part of component (b) and/or optional component (c) and to react this prepolymer in a second reaction stage with the remaining quantity of component (b) and optionally, component (c), but such a two-stage procedure is less preferred.

The molded articles produced by the process according to the invention are distinguished by an improved, i.e., more homogeneous, surface when compared with similar molded articles which have been produced without the aid of component (e). The molded articles obtainable by the process according to the invention are suitable in particular for the manufacture of flexible automobile buffer rods or car body elements and for the internal fittings of automobiles, such as brackets, side panellings or dashboards, or for the manufacture of saddle seats for bicycles or motor bikes. With suitable variation of starting components (a) through (d), in particular by using a relatively small proportion of aminic starting components, it is possible, for example, to obtain products, such as flexible shoe soles, with good abrasion resistance and excellent mechanical strength.

In the examples which follow, all percentages are percentages, by weight, and all "parts" are parts, by weight.

The following polymers and polymer solutions are used in the examples which follow:

POLYMER SOLUTION A

Mixture of one part of dichloromethane and 1 part of a copolymer of 30% of ethyl acrylate and 70% of ethyl hexyl acrylate, average molecular weight 10,000.

POLYMER SOLUTION B

Mixture of 1 part of dichloromethane and 1 part of poly ethyl hexyl acrylate, average molecular weight 8,000.

POLYMER SOLUTION C

Mixture of 1 part of dichloromethane and 1 part of a copolymer of 70% of n-butyl acrylate and 30% of n-butyl methacrylate, average molecular weight 10,500.

POLYMER SOLUTION D

Mixture of 1 part of dichloromethane and 1 part of a copolymer of 50% of ethylhexyl acrylate and 50% of decyl methacrylate, average molecular weight 10,000.

POLYMER SOLUTION E

Mixture of 1 part of dichloromethane and 1 part of a copolymer of 75% of ethylhexyl acrylate and 25% of n-butyl acrylate, average molecular weight 11,000.

POLYMER SOLUTION F

Mixture of 1 part of dichloromethane and 1 part of a copolymer of 50% of n-butyl acrylate and 50% of ethylhexyl acrylate, average molecular weight 9,500.

POLYMER SOLUTION G

Mixture of 1 part of dichloromethane and 1 part of a copolymer of 50% of n-butyl acrylate, 20% of ethylhexyl acrylate and 30% of methacrylonitrile, average molecular weight 15,000.

Polymer solutions A through G were prepared by the following general method:

The monomers and solvents shown in Table 1 are mixed in a 0.3 liter stirring vessel under nitrogen and heated to the reflux temperature. 1.5 g of tertiary butyl peroctoate are measured into the mixture in the course of 5 hours and the mixture is then stirred for 8 hours at 100° C. The solvent is then distilled off under vacuum, the polymer being heated to 160° C. in the course of the distillation under a vacuum of 0.133 mbar. The solvent-free polymers are obtained as distillation residue.

TABLE 1

|  | A | B | C | D | E | F | G |
|---|---|---|---|---|---|---|---|
| Monomers |  |  |  |  |  |  |  |
| Ethyl acrylate | 30 | — | — | — | — | — | — |
| n-butyl acrylate | — | — | 70 | — | 25 | 50 | 50 |
| Ethylhexyl acrylate | 70 | 100 | — | 50 | 75 | 50 | 20 |
| n-butyl methacrylate | — | — | 30 | — | — | — | — |
| methacrylonitrile | — | — | — | — | — | — | 30 |
| decyl methacrylate | — | — | — | 50 | — | — | — |

TABLE 1-continued

|  | A | B | C | D | E | F | G |
|---|---|---|---|---|---|---|---|
| Solvent | | | | | | | |
| Toluene | 60 | — | 60 | — | 60 | — | 60 |
| Isobutanol | — | 60 | — | 60 | — | — | — |
| Methyl glycol acetate | — | — | — | — | — | 60 | — |
| Properties of the Polymers | | | | | | | |
| Viscosity, η (mPa.s) | 6 | 380 | 98 | 430 | 32 | 650 | 289 |
| Molecular weight (by vapor pressure osmometry in acetone) | 10000 | 8000 | 10500 | 10000 | 11000 | 9500 | 15000 |

EXAMPLE 1

90 parts of a polyether polyol with OH number 27, prepared by the propoxylation of trimethylol propane followed by ethoxylation of the propoxylation product, 17 parts of ethylene glycol, 5 parts of a carbon black paste (20% carbon black in 80% of a polyether polyol with OH number 35, prepared by propoxylation followed by ethoxylation of trimethylol propane), 0.4 parts of triethylene diamine, 0.04 parts of dibutyl tin dilaurate and 1 part of zinc stearate are mixed with, in each case, 0.2 parts of polymer solutions A through G, respectively, (dissolved in 10 parts of trichlorofluoromethane) to form polyol components 1A through 1G.

100 parts of polyol components 1A to 1G are, in each case, mixed with 99 parts of a polyisocyanate component (isocyanate index 105), with an isocyanate content of 23%, which has been obtained by the reaction of 4,4'-diisocyanato-diphenyl methane with tripropylene glycol, by vigorous stirring at room temperature. 240 ml of the reaction mixture obtained in each case are introduced after 10 seconds stirring into aluminum molds measuring 20×20×1 cm which have been adjusted to a temperature of 60° C. These molds are designed to be closed and their surfaces are coated with a commercial wax-based mold release agent (P 180 manufactured by Acmos). After a dwell time in the mold of 5 minutes, the molded articles are removed from the mold and assessed. The articles consist of molded plates with a deep black gloss which have a compact, thick surface layer with no visible irregularities on the surface. A molded article prepared by a similar process but without the use of the combination of zinc stearate and the polymer solutions, which is an essential feature of the invention, has a rough, mat surface and a substantially thinner compact surface layer.

EXAMPLE 2

70 parts of a polyether diol with OH number 28, prepared by the propoxylation of 1,2-dihydroxy propane followed by ethoxylation of the propoxylation product, 20 parts of the polyether triol of the carbon black paste of Example 1, 1 part of ethylene glycol, 14 parts of 1,4-dihydroxy butane, 0.3 parts of triethylene diamine, 0.2 parts of dibutyl tin dilaurate and 0.75 parts of zinc stearate are combined with solutions of, in each case, 1 part of polymer solutions A through G, in 8 parts of trichlorofluoromethane, to form polyol components 2A through 2G.

115 parts of the polyol components 2A to 2G are worked up in each case with 74 parts of a reaction product (isocyanate index 102) of 4,4'-diisocyanatodiphenyl methane and tripropylene glycol (isocyanate content 23%), as described in Example 1, to produce foamable mixtures which are formed into molded products. Like the molded articles of Example 1, the molded products obtained have a flawless surface and a thick outer skin.

EXAMPLE 3

90 parts of the polyether with OH number 27 according to Example 1, 25 parts of ethylene glycol, 5 parts of carbon black paste according to Example 1, 0.6 parts of triethylene diamine, 0.05 parts of dibutyl tin dilaurate, 5 parts of trichlorofluoromethane, 1 part of polymer solution C, and 1 part of zinc stearate are combined to form a polyol component.

The polyisocyanate component used is a mixture, with an isocyanate content of 24.5% and a viscosity at 25° C. of 300 mPa.s, composed of (a) 75 parts of the modified polyisocyanate according to Example 1 and (b) 25 parts of a partially carbodiimized 4,4'-diisocyanatodiphenyl methane (isocyanate content 30%).

When the polyol component and polyisocyanate component are reacted to produce solid molded articles, a ratio, by weight, of 123:100, is observed (isocyanate index 105). For this reaction, the components are mixed together, using a high pressure piston feed machine (HK 165 of Firma Hennecke, Sankt Augustin) equipped with a 2-component mixing head, and the reaction mixture is introduced into a closed aluminum mold measuring 120×20×0.4 cm. The internal walls of the mold were previously coated with a commercial mold release agent (Fluoricon ®36/38 of Forma Acmos).

| Data of machine | |
|---|---|
| Filling time | 1.5 seconds |
| Raw material temperature | 35° C. |
| Mold temperature | 60° C. |
| Mold dwell time | 90 seconds. |
| Mechanical data | |
| Density (kg/m³) | 1050 |
| Hardness (Shore D) | 64 |
| Tensile strength (MPa) | 28 |
| Elongation (%) | 210 |
| G modulus (MPa): | |
| (−30° C.) | 420 |
| (20° C.) | 180 |
| (65° C.) | 90 |
| Bending modulus (MPa) | 480 |
| Sag value (1 hr., 120° C.) (mm) | 8. |

The molded articles have a flawless, smooth black surface.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of molded articles based on polyurethanes and/or polyureas, having a smooth surface, by the reaction inside a closed mold, of a reaction mixture comprising:
   (i) at least one organic polyisocyanate compound, and
   (ii) at least one compound having a molecular weight of from 400 to 12,000 which contains at least two isocyanate-reactive groups,
   (iii) at least one isocyanate-inert polymer or copolymer of at least one olefinically-unsaturated monomer, which polymer or copolymer has a molecular weight in the range of from 200 to 50,000, determined by vapor pressure osmometry, and is liquid at room temperature and soluble in the reaction mixture, used in a quantity of from 0.01 to 1% by weight, based on component (ii), and
   (iv) at least one metal salt of a monocarboxylic acid having at least 8 carbon atoms, used in a quantity of from 0.01 to 2% by weight, based on component (ii).

2. A process according to claim 1, characterized in that the reaction mixture also comprises at least one compound having a molecular weight of from 32 to 399 having at least two isocyanate-reactive groups.

3. A process according to claims 1 or 2, characterized in that a polyisocyanate or polyisocyanate mixture of the diphenyl methane series and liquid at room temperature is used as component (i).

4. A process according to claim 3, characterized in that the polyisocyanate or polyisocyanate mixture of the diphenyl methane series is modified with carbodiimide, uretone imine or urethane and is liquid at room temperature.

5. A process according to claims 1 or 2, characterized in that at least one difunctional or trifunctional polyether polyol within the molecular weight range of from 1,000 to 7,000, is used as component (ii).

6. A process according to claim 2, characterized in that at least one aromatic diamine having at least one alkyl substituent with 1 to 3 carbon atoms in an ortho position to a first amino group, and alkyl substituents with 1 to 3 carbon atoms in both ortho positions to the second amino group and having a molecular weight within the range of from 32 to 399 is used in a quantity of from 10 to 40%, by weight, based on component (ii).

7. A process according to claim 2, characterized in that at least one aliphatic diol within the molecular range of from 62 to 200 is used in a quantity of from 10 to 40%, by weight, based on component (ii).

8. A process according to claim 2, characterized in that at least one aromatic diamine having at least one alkyl substituent with 1 to 3 carbon atoms in an ortho position to a first amino group, and alkyl substituents with 1 to 3 carbon atoms in both ortho positions to the second amino group and at least one aliphatic diol, the diamine having a molecular weight within the range of from 32 to 399 and the diol having a molecular weight within the range of from 62 to 200, are used in a total quantity of from 10 to 40%, by weight, based on component (ii).

9. A process according to claims 1 or 2, characterized in that the reaction is carried out in the presence of an organic blowing agent.

10. A process according to claims 1 or 2, characterized in that a polymer or copolymer with a molecular weight of from 2,000 to 30,000 determined by vapor pressure osmometry, and obtained from 50 to 100 parts, by weight, of at least one $C_1$–$C_{18}$ alkyl ester of acrylic or methacrylic acid and 0 to 50 parts, by weight, of another olefinically-unsaturated isocyanate inert monomer is used as component (iii).

11. A process according to claims 1 or 2, characterized in that at least one carboxylate of a metal from the first through third main groups or from the second sub-group of the periodic table of the elements is used as component (iv).

12. A process according to claim 11, characterized in that a zinc salt is used as component (iv).

13. A process according to claims 1 or 2, characterized in that the reactants are reacted together by the one-shot process by mixing component (i) with component (ii) or with a mixture of component (ii) and (iii), to obtain an isocyanate index of from 70 to 130, components (iii) and (iv) having previously been added to one or both reactants.

* * * * *